Oct. 27, 1964  E. GUIDI  3,154,474
MEANS FOR SECURING PRESSURE TUBES CONTAINING
FUEL ELEMENTS IN A NUCLEAR REACTOR
Filed May 26, 1961  2 Sheets-Sheet 2
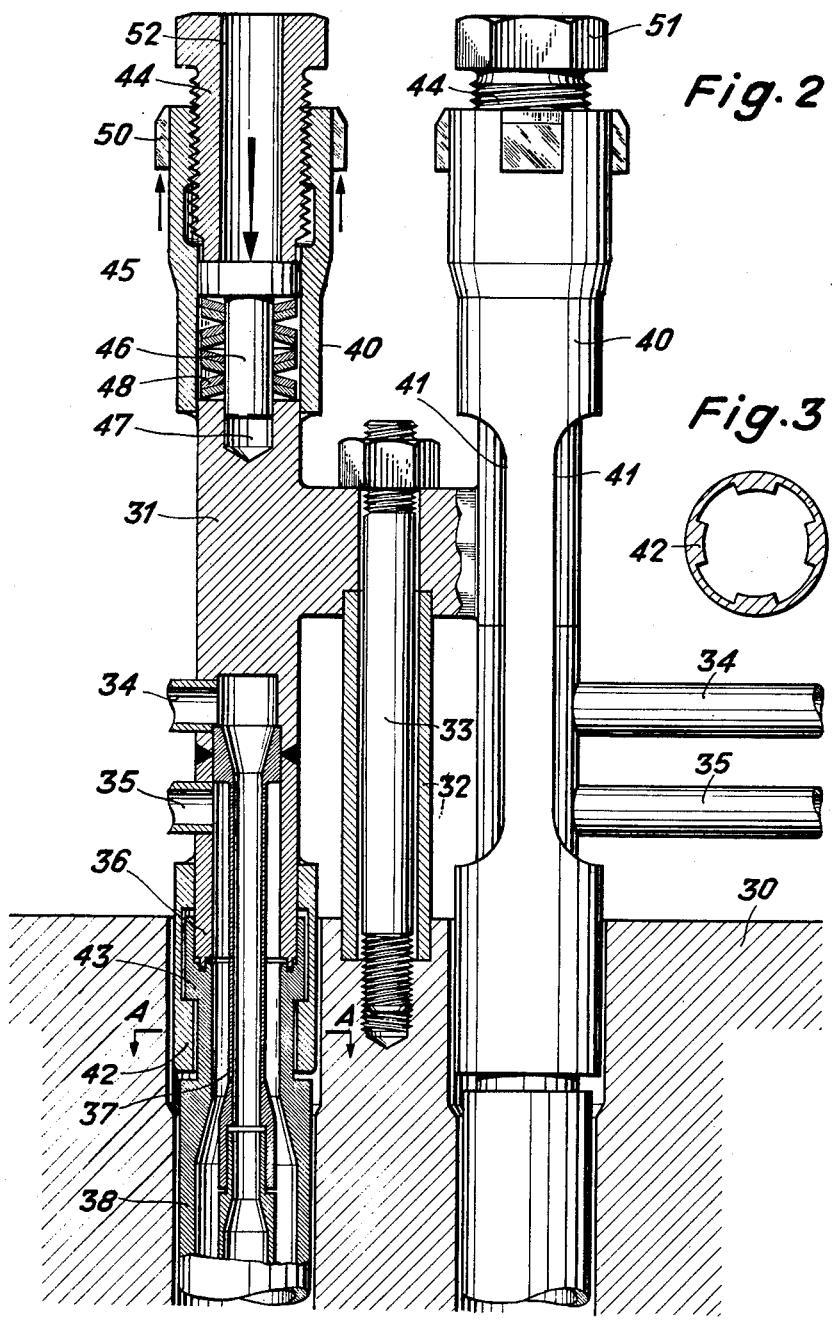
Inventor:
EUGEN GUIDI

United States Patent Office 3,154,474
Patented Oct. 27, 1964

3,154,474
MEANS FOR SECURING PRESSURE TUBES CONTAINING FUEL ELEMENTS IN A NUCLEAR REACTOR
Eugen Guidi, Winterthur, Switzerland, assignor to Sulzer Freres, S.A., Winterthur, Switzerland, a corporation of Switzerland
Filed May 26, 1961, Ser. No. 112,876
Claims priority, application Switzerland, June 8, 1960
6 Claims. (Cl. 176—64)

The invention relates to means for securing pressure tubes in the moderator part of a nuclear reactor, the pressure tubes containing rodlike parts including fissionable material. The pressure tubes conduct a coolant in heat exchange relation with said rodlike parts. The securing means with which the invention is concerned include pipe connections for conducting the coolant to and from the pressure tubes.

Nuclear reactors have been proposed wherein the means for securing the pressure tubes and for connecting supply and relief pipes for the coolant to the pressure tubes are placed at one side of the reactor and removal of spent fuel rods and insertion of new fuel rods together with the pressure tubes is effected at the opposite side of the reactor.

It is an object of the present invention to provide a particularly simple and reliable device for securing pressure tubes in a nuclear reactor of the type wherein the pressure tubes are secured and connected to coolant supply and relief conduits on one side of the moderator unit and can be inserted and removed at the opposite side. The securing device according to the invention comprises stationary connecting means adapted to be connected to coolant supply and relief pipes, a movable element adapted to press a pressure tube against the stationary element, and an elastic element interposed between the connecting means and the movable element for urging the latter to press the pressure tube against the connecting means.

In a preferred embodiment of the invention means are provided for adjusting the pressure exerted by the elastic element on the movable element.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a part-sectional view of a modified securing device according to the invention.

FIG. 3 is a cross-sectional illustration of one half of the securing device shown in FIG. 2, the section being made along line A—A of FIG. 2.

Figure 1:
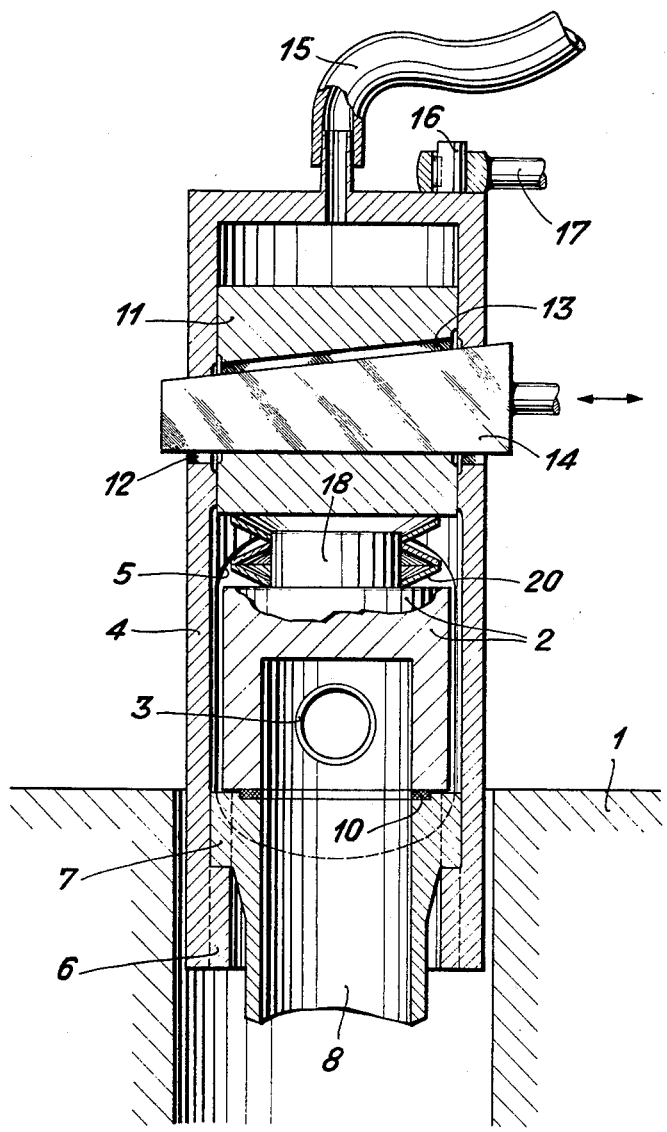
FIG. 1 is a longitudinal sectional view of a securing device according to the invention.

Referring more particularly to FIG. 1 of the drawing, numeral 1 designates the moderator part of a nuclear reactor which part is shown only diagrammatically. A stationary connecting means 2 is mounted to the moderator part 1 in any suitable manner, not shown. Pipes 3 are connected to the means 2 for supplying to and relieving a coolant from the means 2. Only one pipe 3 is visible in FIG. 1, the other pipe is connected to the portion of the means 2 which is cut away in FIG. 1. The means 2 is surrounded by a sleeve 4 provided with lateral openings 5 through which the means 2 extend. The lower end of the sleeve 4 is provided with inwardly projecting protuberances 6 which cooperate with corresponding protuberances 7 at the top of a pressure tube 8 to form a bayonet joint. A packing or sealing ring 10 is interposed between the top of the tube 8 and the bottom surface of the connecting means 2. The upper end of the sleeve 4 forms a hollow cylinder containing a piston 11. The cylindrical part of the sleeve 4 and the piston 11 are provided with openings 12 and 13, respectively, adapted to receive a wedge 14. The space in the cylinder above the piston 11 is connected to a source of pressure fluid, for example air, by means of a conduit 15. A pin 16 projects outwardly from the sleeve 4, a lever 17 being rigidly connected to the pin 16 for rocking the sleeve 4 about its longitudinal axis. The connecting means 2 includes an axial pin 18 around which a cup spring 20 having three elastic elements is placed and which limits the downward movement of the piston 11. The cup spring 20 is interposed between the connecting means 2 and the piston 11.

FIG. 1 shows the device according to the invention in the position retaining a pressure tube in the moderator part of a nuclear reactor. The cup spring 20 presses with predetermined force against the piston 11. The force is transmitted through the wedge 14 to the sleeve 4 which is movable relative to the stationary connecting means 2. Due to the pressure exerted by the spring 20 the protuberances 6 of the sleeve 4 act in axial direction on the protuberances 7 of the pressure tube 8, pressing the latter and the seal 10 against the connecting means 2. If it is desired to release the tube 8 from the connecting means 2, pressure fluid is admitted through the pipe 15 into the space of the cylindrical part of the sleeve 4 above the piston 11 for overcoming the pressure produced by the spring 20 and loosening the wedge 14 so that the latter can be moved to the right as seen in FIG. 1 and removed. Thereupon the pressure in the cylindrical space above the piston 11 is reduced to the ambient pressure so that the tube 8 is no longer pressed against the means 2 and the sleeve 4 can be rotated by means of the lever 17 to disengage the protuberances 6 and 7. The tube 8 can now be moved downward and removed from the moderator part of the reactor. A new tube may be inserted from below and the tube and the sleeve 4 be held in such relative angular position as to permit passage of the protuberances 7 through the gaps between the protuberances 6 whereupon the sleeve 4 is rotated by means of the lever 17 until the protuberances 6 axially abut the protuberances 7. A pressure fluid is now supplied through the pipe 15 and the piston 11 is pressed against the spring 20 whereupon the wedge 14 is inserted, fixing the position of the piston 11. The pressure in the cylindrical space above the piston 11 can now be reduced.

The pressure at which the tube 8 is pressed against the connecting means 2 is defined by the pressure prevailing in the cylindrical space above the piston 11 at the moment the wedge 14 is inserted. By adjusting the pressure of the pressure fluid and the position of the wedge 14 the pressure at which the spring 20 presses the tube 8 against the part 2 can be regulated as desired. Because of the provision of the spring 20 in the securing device according to the invention, the pressure urging the tube 8 against the stationary connecting means 2 remains substantially the same even if, for example, the seal 10 should yield. The securing device according to the invention is, therefore, preferable to fixed connecting means using screws and the like. The spring 20 also compensates unequal heat expansion of the connected parts and produces a substantially equal sealing pressure under variable operating conditions. Therefore, the parts of which the securing device is made and also the tube can be made of most suitable materials without regard to the heat expansion properties thereof.

The modified securing device illustrated in FIGS. 2 and 3 comprises an H-shaped support 31 which is mounted on a moderator part 30 of a nuclear reactor by means of a bolt 33 and a spacer tube 32. The support has two vertical portions to each of which pipes 34 and 35 are connected for supplying and relieving a coolant. Each of the lower ends of the vertical portions of the support 31 includes parts 36 and 37 for connecting a pressure tube 38. The two vertical portions of the support 31 are cylindrical, each portion being surrounded by a sleeve element 40 having cutouts 41 through which the pipes 34 and 35 extend and which permit a limited rotation of the sleeves on the support 31. The lower ends of the sleeves 40 are provided with inward protuberances 42 cooperating with corresponding outward protuberances 43 at the upper ends of the tubes 38 and forming bayonet connections. Mushroom-like elements 45 are axially slidable in the upper ends of the sleeves 40 above the top of the support 31. The trunks 46 of the elements 45 extend into bores 47 in the top of the support 31. The trunks 46 are surrounded by cup springs 48. Threaded plugs 44 provided with axial bores 52 and hexagonal heads 51 are screwed into the top ends of the sleeves 40 to abut against the elements 45. The top ends of the sleeves 40 are provided with outward protuberances 50 for rotating the sleeves 40 by a suitable tool.

The device illustrated in FIG. 2 is shown in position for retaining two pressure tubes in the moderator part 30. The inward protuberances 42 of the sleeves 40 axially press against the outward protuberances 43 of the tubes 38 whereby the latter are pressed against the stationary support 36. The pressure abuttingly pressing the tubes against the support 36 corresponds to the initial tension of the springs 48 which is adjusted by the plugs 44. If it is desired to release a pressure tube, the respective element 45 is pressed down against the action of the spring 48 as indicated by an arrow in FIG. 2. It is advisable to simultaneously support the sleeve 40 below the protuberances 50 to produce a force acting in the direction of the arrows shown outside of the sleeve 40 in FIG. 2. After the pressure of the spring 48 has been overcome the plug 44 can easily be removed and the pressure acting on the plunger 45 can be released. The protuberances 42 and 43 are now not pressed axially against each other and the sleeve 40 may be rotated by a tool fitting the protuberances 50 until the protuberances 42 are axially aligned with gaps between the protuberances 43 and vice versa, whereupon the respective tube 38 can be moved downward and removed from the moderator part of the reactor. A new tube may be inserted from below until it abuts against the lower parts 36 and 37 of the support 31. Thereupon the respective sleeve 40 is rotated until the protuberances 42 and 43 axially face each other. Thereupon a downwardly acting pressure is exerted on the element 45 corresponding to the desired pressure for urging the tube against the support 31. If the plug 44 has been loosened or removed when disconnecting the previous pressure tube, the plug must be reinserted and screwed down until is abuts against the element 45. The force acting on the element 45 in the direction of the arrow shown in FIG. 2 can now be released.

The retaining device according to the invention facilitates exchange of pressure tubes and maintains a desired adjustable pressure between the tubes and the connecting means independent of variable heat expansions of the associated parts and of changes of a seal between the connecting means and the pressure tube. Although in both illustrated examples of the invention cup springs are used as elastic elements forming part of the retaining device, other kinds of springs may be used. Separate springs may be omitted entirely if the elasticity of certain of the connected parts suffices to produce the desired retaining and sealing pressure.

I claim:

1. In a nuclear reactor having a moderator part, pressure tubes placed in said moderator part, each pressure tube containing a rodlike fuel element containing fissionable material and conducting a coolant in heat exchange relation to said fuel element, and coolant conducting pipes for supplying a coolant to and relieving the coolant from said pressure tubes: a device associated with each pressure tube for removably securing said pressure tube in said moderator part, said device comprising stationary connecting means including means for connecting a coolant supply pipe and a coolant relief pipe to said connecting means and adapted to abut said pressure tube in axial direction, means movable relative to said pressure tube and to said connecting means and adapted to effect abutment between said connecting means and said pressure tube, and elastic means interposed between said movable means and said connecting means and adapted to urge said movable means to press said pressure tube against said connecting means.

2. In a nuclear reactor as defined in claim 1 and wherein said movable means includes a cylindrical part, and said elastic means is constituted by a cup spring coaxial of said cylindrical part.

3. In a nuclear reactor as defined in claim 1, an adjustable means interposed between said elastic means and said movable means for adjusting the force exerted by said elastic means on said movable means.

4. In a nuclear reactor according to claim 3 and wherein said adjustable means includes a threaded plug screwed into said movable means and endwisely acting on said elastic means.

5. In a nuclear reactor having a moderator part, pressure tubes placed in said moderator part, each pressure tube containing a rodlike fuel element containing fissionable material and conducting a coolant in heat exchange relation to said fuel element, and coolant conducting pipes for supplying a coolant to and relieving the coolant from said pressure tubes: a device associated with each pressure tube for removably securing said pressure tube in said moderator part, said device comprising stationary connecting means including means for connecting a coolant supply pipe and a coolant relief pipe to said connecting means and adapted to abut said pressure tube in axial direction, means movable relative to said pressure tube and to said connecting means and adapted to effect abutment between said connecting means and said pressure tube, elastic means interposed between said movable means and said connecting means and adapted to urge said movable means to press said pressure tube against said connecting means, and an adjustable means interposed between said elastic means and said movable means for adjusting the force exerted by said elastic means on said movable means, said adjustable means including a wedge-like element.

6. In a nuclear reactor having a moderator part, pressure tubes placed in said moderator part, each pressure tube containing a rodlike fuel element containing fissionable material and conducting a coolant in heat exchange relation to said fuel element, and coolant conducting pipes for supplying a coolant to and relieving the coolant from said pressure tubes: a device associated with each pressure tube for removably securing said pressure tube in said moderator part, said device comprising stationary connecting means including means for connecting a coolant supply pipe and a coolant relief pipe to said connecting means and adapted to abut said pressure tube in axial direction, means movable relative to said pressure tube and to said connecting means and adapted to effect abutment between said connecting means and said pressure tube, elastic means interposed between said movable means and said connecting means and adapted to urge said movable means to press said pressure tube against said connecting means, and an adjustable means interposed between said elastic means and said movable means for adjusting the force exerted by said elastic means on said movable means, said stationary connecting means including a hollow cylinder and said adjusting means including a piston movable in said cylinder and having an end face abutting said elastic means and having a second end face, and means connected to said cylinder for supplying a pressure fluid to the space in said cylinder at said second end face of said piston.

References Cited in the file of this patent

UNITED STATES PATENTS

| | | |
|---|---|---|
| 2,949,202 | Treshow | Aug. 16, 1960 |
| 2,984,609 | Dickson | May 16, 1961 |
| 2,984,612 | Hackney et al. | May 16, 1961 |
| 3,000,728 | Long et al. | Sept. 19, 1961 |